Nov. 6, 1928.  
T. J. NEWMAN  
METER MOUNTING  
Filed July 26, 1924  
1,690,174  
2 Sheets-Sheet 1
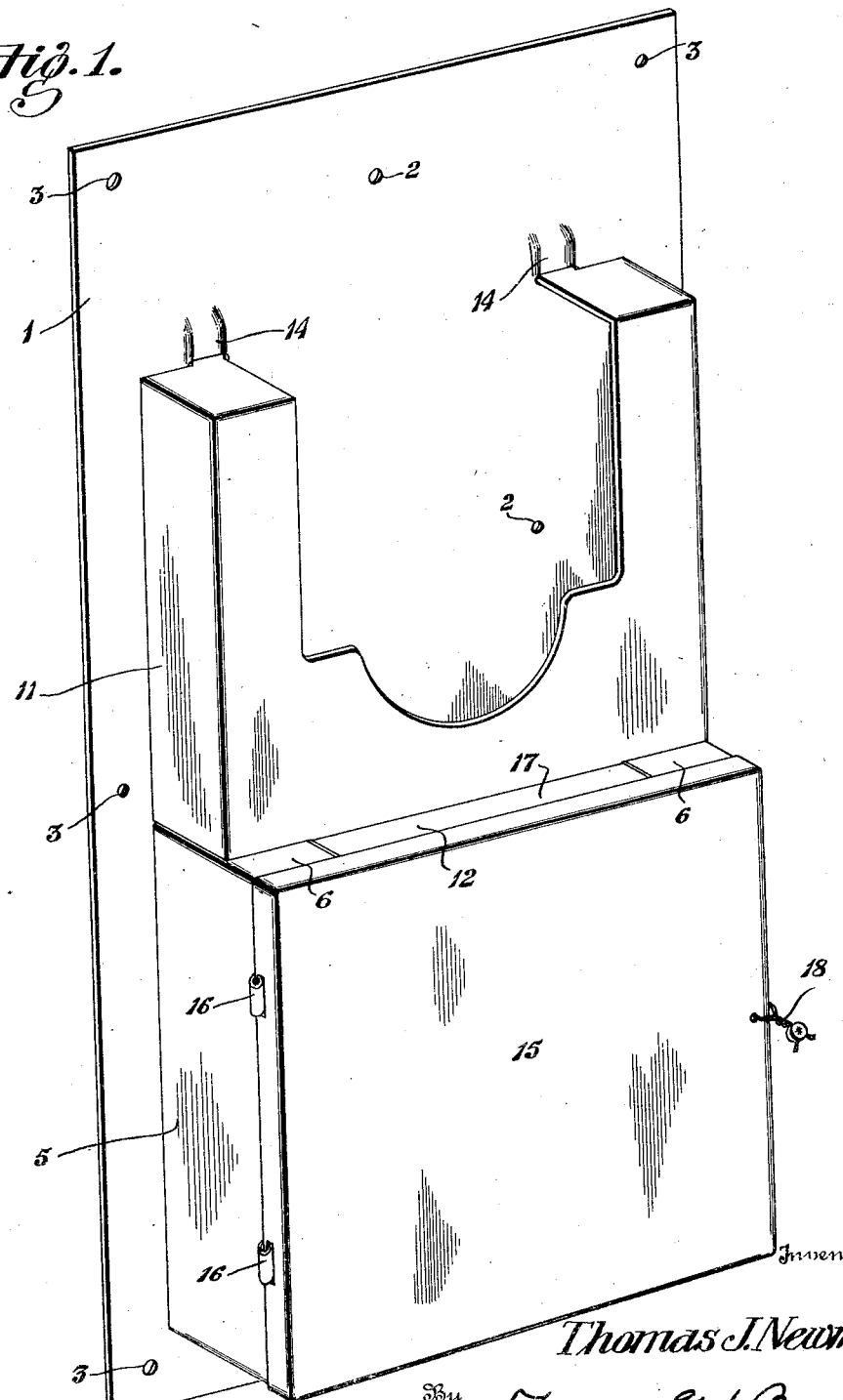

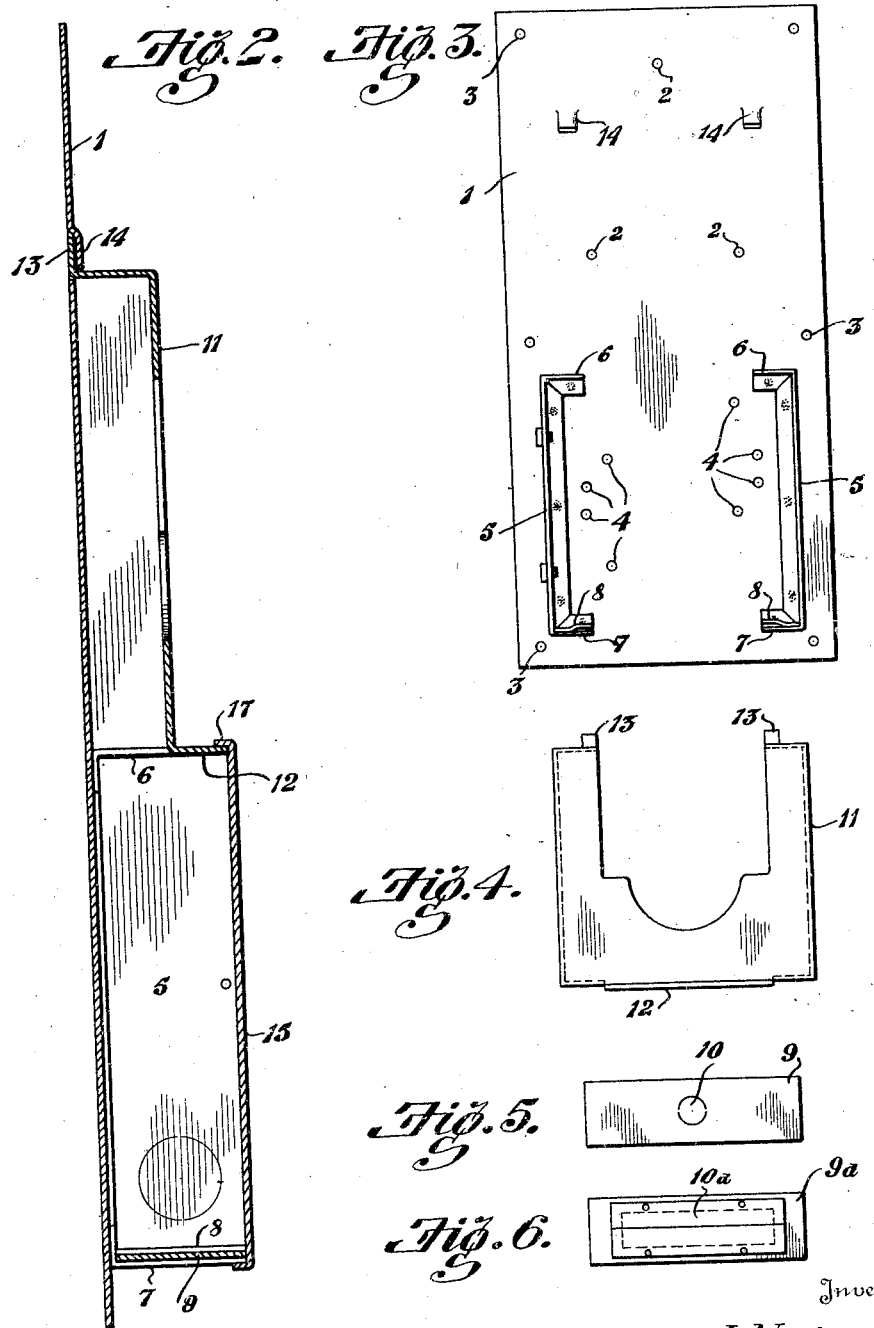

Patented Nov. 6, 1928.

1,690,174

UNITED STATES PATENT OFFICE.

THOMAS J. NEWMAN, OF CANTON, OHIO, ASSIGNOR TO THE SUPERIOR SWITCHBOARD & DEVICES COMPANY, OF CANTON, OHIO, A CORPORATION OF OHIO.

METER MOUNTING.

Application filed July 26, 1924. Serial No. 728,505.

The invention relates to meter devices and more particularly to a metal meter mounting which is fireproof and foolproof.

The object of the invention is to provide a meter mounting in which the meter trim and switch box are held in locked position when the door of the switch box is closed and sealed, protecting the meter and switch against tampering by unauthorized persons.

The above and other objects are attained by providing a metal base plate or back plate upon which the side walls of the switch box may be permanently mounted, the meter trim having ears at its upper end arranged to be extended into sockets formed in the base plate, the lower end of the meter trim resting upon the side walls of the switch box and having a flange forming the top wall of the switch box, the bottom wall of the switch box being supported upon inturned flanges at the lower ends of the side walls.

The door of the switch box is flanged around its edges, whereby when the same is closed and sealed, it not only protects the switch block, within the box, from unauthorized interference, but also locks the meter trim against removal, thus preventing tampering with the meter and also retains the bottom wall of the switch box in position.

An embodiment of the invention thus set forth in general terms, is illustrated in the accompanying drawings, in which—

Figure 1 is a perspective view of a meter mounting embodying the invention, showing the same assembled, the meter being omitted for the purpose of illustration;

Fig. 2, a vertical sectional view through the same;

Fig. 3, a front elevation of the base board on a smaller scale;

Fig. 4, a front elevation of the meter trim;

Fig. 5, a plan view of the all metal bottom wall of the switch box; and

Fig. 6, a similar view of the metal and asbestos bottom wall.

Similar numerals refer to similar parts throughout the drawings.

The structure includes a rectangular metal base plate 1 provided with the apertures 2 for bolting or otherwise securing a meter thereto, and with the apertures 3 for attaching the base plate to a wall or the like. Other apertures 4 may be provided in the lower half of the plate for securing an insulated switch block.

The side walls 5 of the switch box may be in the form of angles spot welded to the front face of the base plate near each side of the lower portion thereof. Each of the side walls is provided with the upper and lower inturned flange portions 6 and 7 respectively.

An ear 8 is connected to each lower flange 7 at its outer end, the inner end of the ear being spaced from the flange, forming a channel to receive the end portions of the bottom wall of the switch box.

This bottom wall may be a single metal sheet 9, as shown in Fig. 5, provided with a central knock-out portion 10, through which the wires may be extended, or, as shown in Fig. 6, it may comprise a rectangular metal frame portion $9^a$ to which the asbestos panel $10^1$ is connected. This panel may be made in two parts, as shown in Fig. 6, and an opening may be formed in the same to receive the wires from the switch block.

The meter trim indicated generally at 11 having a front wall $11^a$, side walls $11^b$, and an end wall $11^c$, is shaped to enclose the lower portion of the meter concealing all wires from the meter to the switch box, and arranged to rest upon the upper flanges 6 of the side walls of the switch box and provided with an outturned flange 12, at its lower edge, arranged to be inserted between said flanges, forming the upper wall of the switch box. A pair of ears 13 are provided on the upper end wall of the meter trim and arranged to be inserted into the sockets 14 provided in the upper portion of the base plate.

The door 15 is arranged to be hinged as at 16 to one of the side walls 5 of the switch box, and is provided around its edges with the inturned, angular flange 17 arranged to extend over the side, top and bottom walls of the switch box.

Thus when the lid is closed and sealed, as indicated at 18 in Fig. 1, it will be seen that the switch mechanism is enclosed, the bottom wall of the switch box is locked against removal and the meter trim is locked against removal, thus preventing tampering with the meter or switch mechanism by an unauthorized person.

I claim:—

1. A meter mounting including a base plate having a pair of spaced sockets in its upper portion, a switch box upon its lower portion, a meter trim having ears at its upper end for engagement in said sockets and provided with a flange at its lower end and a door upon the switch box having a flange at its upper edge arranged to extend over the flange upon the meter trim when the door is closed.

2. A meter mounting including a base plate having a pair of spaced sockets in its upper portion, a switch box upon its lower portion provided with an open upper end, a meter trim having ears at its upper end for engagement in said sockets and provided with a flange at its lower end adapted to extend into the open upper end of the switch box, and a door upon the switch box having a flange at its upper edge arranged to extend over the flange upon the meter trim when the door is closed.

3. A meter mounting including a base plate having a switch box upon its lower portion provided with an open upper end, a meter trim having means for connecting at its upper end to the base plate and having an angular flange at its lower end adapted to extend into the open upper end of the switch box, and a door upon the switch box having a flange at its upper edge adapted to extend over the flange upon the meter trim when the door is closed.

4. A meter mounting including a base plate, spaced side walls of a switch box permanently mounted upon the base plate and provided with inturned channel flanges at their lower ends, a meter trim having means at its upper end for connection to the base plate and provided with a flange at its lower end adapted to extend between the side walls of the switch box, a removable bottom wall for the switch box received between said channel flanges and a door upon the switch box having flanges at its upper and lower edges arranged to extend over the flange upon the meter trim and beneath the bottom wall when the door is closed.

5. A meter mounting including a base plate, spaced side walls of a switch box permanently mounted upon the base plate and provided with inturned channel flanges at their lower ends, a meter trim having means at its upper end for connection to the base plate and provided with a flange at its lower end adapted to extend between the side walls of the switch box, a removable bottom wall for the switch box received between said channel flanges and a door upon the switch box having flanges at its upper and lower edges arranged to extend over the flange upon the meter trim and beneath the bottom wall when the door is closed.

6. A meter mounting including a base plate having a pair of spaced sockets in its upper portion, a switch box upon its lower portion, a meter trim having ears at its upper end for engagement in said sockets and provided with a flange at its lower end and a door upon the switch box having a flange at its upper edge arranged to extend over the flange upon the meter trim when the door is closed, said door being hinged to one side wall of the switch box and means for locking said door to the other side wall.

7. A meter mounting including a base plate having a pair of spaced sockets in its upper portion, a switch box upon its lower portion provided with an open upper end, a meter trim having ears at its upper end for engagement in said sockets and provided with a flange at its lower end adapted to extend into the open upper end of the switch box, and a door upon the switch box having a flange at its upper edge arranged to extend over the flange upon the meter trim when the door is closed, said door being hinged to one side wall of the switch box and means for locking said door to the other side wall.

8. A meter mounting including a base plate having a pair of spaced sockets in its upper portion, a switch box upon its lower portion provided with an open upper end, a meter trim having its end front and side walls integral and having ears on its upper end wall for engagement in said sockets and provided with a flange at its lower end adapted to extend into the open upper end of the switch box, and a door upon the switch box having a flange at its upper edge arranged to extend over the flange upon the meter trim when the door is closed.

In testimony that I claim the above, I have hereunto subscribed my name.

THOMAS J. NEWMAN.